United States Patent

Van Berkel et al.

[11] Patent Number: 6,118,584
[45] Date of Patent: Sep. 12, 2000

[54] AUTOSTEREOSCOPIC DISPLAY APPARATUS

[75] Inventors: Cornelis Van Berkel, Hove; David W. Parker, Red Hill, both of United Kingdom

[73] Assignee: U.S. Philips Corporation, New York, N.Y.

[21] Appl. No.: 08/670,377

[22] Filed: Jun. 25, 1996

[30] Foreign Application Priority Data

Jul. 5, 1995 [GB] United Kingdom ............... 9513658

[51] Int. Cl.$^7$ ............... G02B 27/22; H04N 9/47; G02F 1/133
[52] U.S. Cl. .............. 359/463; 359/462; 359/464; 348/54; 348/59; 349/15; 349/146
[58] Field of Search ............ 359/462, 463, 359/464, 619; 349/15, 145, 146, 95; 345/55; 348/51, 54

[56] References Cited

U.S. PATENT DOCUMENTS

| 3,936,816 | 2/1976 | Murata ............................ 349/146 |
| 4,335,937 | 6/1982 | Takamatsu et al. ............... 349/145 |
| 4,811,003 | 3/1989 | Strathman et al. ............... 349/145 |
| 5,602,658 | 2/1997 | Ezra et al. ....................... 349/95 |

FOREIGN PATENT DOCUMENTS

| 0625861 | 11/1994 | European Pat. Off. . |
| 0151331A1 | 8/1985 | United Kingdom . |
| 0625861A2 | 11/1994 | United Kingdom . |

OTHER PUBLICATIONS

"3D Displays for Videotelephone Applications" D. Sheat et al, Proceedings of Eurodisplay 93 Conference at Strasbourg, Aug. 1993.

*Primary Examiner*—Jon W. Henry
*Assistant Examiner*—Audrey Chang
*Attorney, Agent, or Firm*—Dwight H. Renfrew, Jr.

[57] ABSTRACT

An autostereoscopic display apparatus includes a matrix display panel (10), preferably an active matrix liquid crystal display panel, having display elements (12) in rows and columns and arranged in groups of at least three adjacent display elements, and an optical director (15) in the form of, for example, a lenticular screen overlying the panel (10) and having lenticules (16) extending in the column direction with each lenticule overlying an associated display element group, in which adjacent display elements in a group are arranged so as to partly overlap one another in the column direction (Y). The display elements in a group can, for example, be arranged in a line in the row direction (X) and shaped as non-rectangular parallelograms, or triangles, successive ones being inverted, or interdigitated, or arranged in two or more rows. As a result, unwanted display artifacts such as dark banding caused by black matrix extending between columns of display elements is eliminated and the transition between stereoscopic views is smoothed due to an image merging effect as a viewer's head moves in the row direction.

22 Claims, 5 Drawing Sheets

AUTOSTEREOSCOPIC DISPLAY APPARATUS

BACKGROUND OF THE INVENTION

1. Field of the Invention

The present invention relates to an autostereoscopic display apparatus comprising a matrix display panel having an array of display elements which are arranged so as to extend in rows and columns in a row and column direction respectively and in groups with each group comprising N adjacent display elements in the row direction where N is a number greater than two, and optical director means comprising a plurality of optical director elements each of which is associated with a respective group of display elements for directing the outputs of the display elements in mutually different angular directions.

2. Description of the Related Art

Such an apparatus is described in EP-A-0625 861. The matrix display panel in this apparatus comprises an active matrix (TFT type) LC (liquid crystal) display panel acting as a spatial light modulator. It is usual in conventional, ordinary view, types of active matrix LC display panels comprising a planar array of display elements to space the display elements apart in columns at regular intervals and to provide a black mask over the intervening spaces which shields the switches, comprising TFTs from light and which extends between adjacent columns of display elements, and between adjacent rows, to mask address conductors and enhance contrast. The display element layout in a standard direct view or projection type active matrix LC display panel is designed to create a perfectly repetitive pattern at small enough pitch to go undetected by the eye. However, when such panels are used for autostereoscopic display purposes with optical director means such as lenticular screens, microlens arrays, or the like to create a 3D display, the black mask pattern gives rise to visible artifacts. In the apparatus described in this specification, the display elements of each group are arranged so as to be substantially contiguous with one another in the row direction in order to reduce problems with display artifacts caused by the black masking. When viewing a conventional LC display panel with regularly-spaced display elements through the optical director means, which in this known apparatus comprises, for example, a lenticular screen having a plurality of parallel lenticules each of which is disposed over a plurality of adjacent columns of display elements in which the display elements of an associated group lie and provides output light beams from the respective columns of display elements associated with the lenticule, then vertical (columnwise) portions of the black mask are also imaged by the lenticule such that the images from adjacent columns of display elements are separated by dark regions and the display output lacks continuous parallax. As a viewer moves his head to perceive a 3D display, in which each column of display element provides a vertical slice of a 2D image, the successive, different, views seen by the viewer are interrupted by the imaged black mask. The grouping of the display elements in substantially contiguous manner helps to overcome this problem as substantial continuous vertical black mask portions are no longer present between adjacent columns. In one embodiment described in EP-A-0 625 861, this is achieved by arranging the display elements, which are generally rectangular in shape, such that one display element is offset with respect to the neighboring display element in the column direction with a vertical edge of the one display element being substantially aligned in the column direction with the adjacent vertical edge of the neighbouring display element. In another described arrangement, capable of providing only one stereoscopic view, each group comprises just two display elements from two adjacent columns of display elements and aligned in the row direction and in which the width of the gap between these adjacent columns is comparatively small.

A similar problem would exist even if the black mask portions between adjacent columns of display elements were to be omitted except that, rather than there being dark regions visible between successive views caused by black mask portions there would be visible artifacts due to the unmodulated regions of the LC layer then exposed.

SUMMARY OF THE INVENTION

It is an object of the present invention to provide an improved autostereoscopic display apparatus.

According to the present invention, an autostereoscopic display apparatus of the kind described in the opening paragraph is characterized in that the display elements in each group are arranged such that in the column direction adjacent display elements partly overlap one another.

Such partial overlapping in the column direction of adjacent display elements in a group is beneficial in that an improved display effect is obtained when viewing stereoscopic images which to a viewer of this display is more pleasing, and more natural, than the display produced by the known display apparatus of EP-A-0 625 681. Considering the known display apparatus, then each lenticule of the lenticular screen provides a plurality of the light output beams, corresponding in number to the number of columns of display elements it overlies, each of which corresponds to a vertical slice of a two dimensional view. As the display elements in each group are substantially contiguous in the horizontal, row, direction then the light output beams from a lenticule are substantially angularly contiguous without any intervening dark regions caused by imaging of vertical bands of black masking and providing to a viewer a plurality of different 2D views with generally continuous horizontal parallax. However, successive 2D views presented to a viewer consequently will change abruptly from one 2D view to the next. In a display apparatus according to the present invention successive 2D views presented to a viewer do not flip abruptly in this manner but rather change in a gradual manner due to a merging effect between successive views resulting from the partially overlapping nature of the adjacent display elements. During the transitions between different views, a merging of the display information in both views is observed. Thus, to the viewer the gradual change in view perceived gives the impression of enhanced continuous horizontal parallax as would be experienced in the real world.

The display elements within a group may be arranged in various ways to achieve this objective.

In one preferred embodiment, the display elements are non-rectangular parallelogram shaped and in a group are arranged in a line with the facing edges of adjacent display elements extending at an angle to the column direction. Preferably, a corner at one side, e.g the left-hand side, of one display element is approximately aligned in the column direction with a corner to the same, i.e left-hand, side of an adjacent display element.

In another preferred embodiment, the display elements are of triangular shape and in a group are arranged in line extending in the row direction with the orientation of one display element being inverted with respect to an adjacent display element such that facing edges of adjacent display elements extend at an angle to the column direction. Preferably a base corner of one display element is approximately aligned in the column direction with the center of the base of an adjacent element.

In another embodiment, the display elements in a group may be shaped and arranged in a line such that the facing edges of adjacent display elements are interdigitated with one another in the row direction.

In all the above embodiments, the shape and layout of the display elements in a group enable a substantially constant output brightness to be achieved even at those regions in the viewing region where merging of adjacent views occurs. Moreover, it is not necessary to make the gap between adjacent display elements in a group extremely small as in the example described in EP-A-0 625 861 in order that the display elements are substantially contiguous with one another in the row direction. The partial overlapping in the column direction of adjacent display elements achieves a similar effect while at the same time allows a wider gap to be present. This is of advantage in that a wider gap provides greater design freedom, for example, permitting address conductors for the display elements to be accommodated between columns of display elements if desired.

In yet another embodiment, the display elements in a group may be substantially rectangular in shape and arranged such that one display element is offset in the column direction with respect to an adjacent display element with an edge of the one display element overlying in the column direction the adjacent display element. If the display elements of a group are arranged in, for example, two adjacent rows, then variations in output brightness can be experienced. Where each group comprises six or more display elements, this brightness variation can be minimised by arranging successive adjacent display elements, in the viewing sense, in at least three rows.

Preferably, the matrix display panel comprises an LC display panel but it is envisaged that other kinds of electro-optic spatial light modulators and flat panel display devices such as electroluminescent or plasma display panels could be used.

Where references are made to the display elements being triangular, parallelogram shaped, or rectangular, it will be appreciated that in the case of an active matrix liquid crystal display panel the required switch devices, such as TFTs or two-terminal non-linear switch devices such as thin film diodes, (TFDs) are provided at each display element and consequently a small proportion of the described shaped may be devoted to the accommodation of the switch device. A panel using two-terminal non-linear switch devices is particularly preferred because only one set of address conductors, for example a set of row address conductors, need be provided on the same plate as the switch devices and the array of electrodes defining the display elements, whereas a TFT type panel requires crossing sets of rows and column address conductors to be provided. By not having a set of column address conductors on the same plate as the two-terminal switch devices and the array of electrodes, problems caused by the need to accommodate such column conductors, and their routing between columns of display element electrodes, are avoided and more freedom is available for display element layouts.

BRIEF DESCRIPTION OF THE DRAWING

Embodiments of autostereoscopic display apparatus in accordance with the present invention will now be described, by way of example, with reference to the accompanying drawings, in which.

Figure 1:
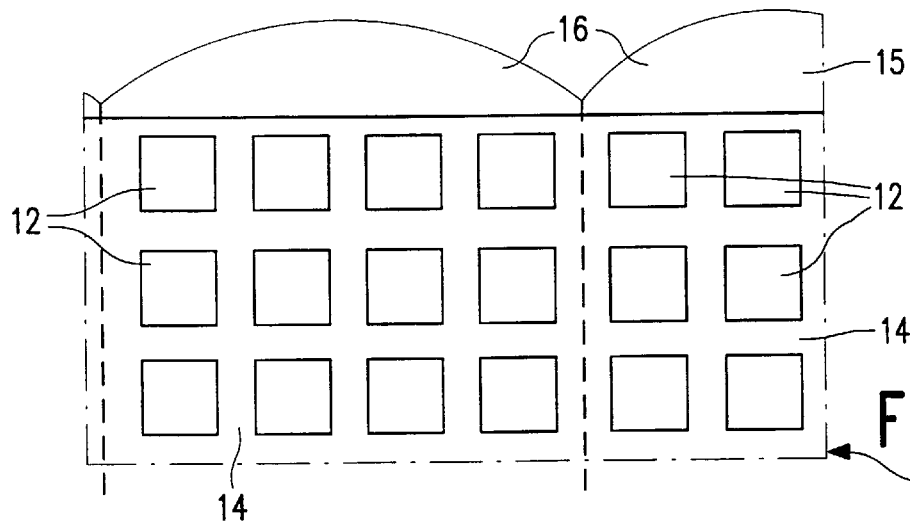
FIG. 1 illustrates schematically the arrangement of display elements in a conventional LC display panel.

It should be understood that the Figures are merely schematic and are not drawn to scale. In particular certain dimensions may have been exaggerated while other dimensions may have been reduced. It should also be understood that the same reference numerals are used throughout the figures to indicate the same or similar parts.

DESCRIPTION OF THE PREFERRED EMBODIMENTS

Referring to FIG. 1, a conventional matrix display panel 10 used as a spatial light modulator comprises a planar array of individually addressable display elements 12 arranged in rows and columns extending perpendicularly to one another, the part of the panel illustrated in FIG. 1 showing a typical portion having three adjacent rows with six display elements in each row. In practice, there may be around 2400 columns and 600 rows in the array. As can be seen, the display elements are of substantially rectangular shape and are regularly spaced with adjacent display elements in a row being separated by a gap extending in the column, vertical, direction and with adjacent rows being separated by a gap extending in the row, horizontal, direction.

Liquid crystal (LC) display panels are commonly used as spatial light modulating display panels. Such LC display panels typically comprise two spaced transparent plates, for example of glass, with twisted nematic or other liquid crystal material between the plates, which plates carry patterns of transparent electrodes, for example of ITO, that determine the layout and shape of the display elements, each display element being defined by opposing electrodes on the two plates with LC material therebetween. In active matrix type LC display panels, each display element is associated with a switch device, comprising for example a thin film transistor (TFT) or a thin film diode (TFD) situated adjacent the display element. In order to accommodate these switching devices the display elements may not be completely rectangular but may have, for example, a corner part missing in which the switching device is located. The gaps between adjacent display elements, both vertically and horizontally, are usually covered by a black mask 14 comprising a matrix of light absorbing material carried on at least one plate so that the display elements are separated from one another by this light opaque material.

Figure 2A:
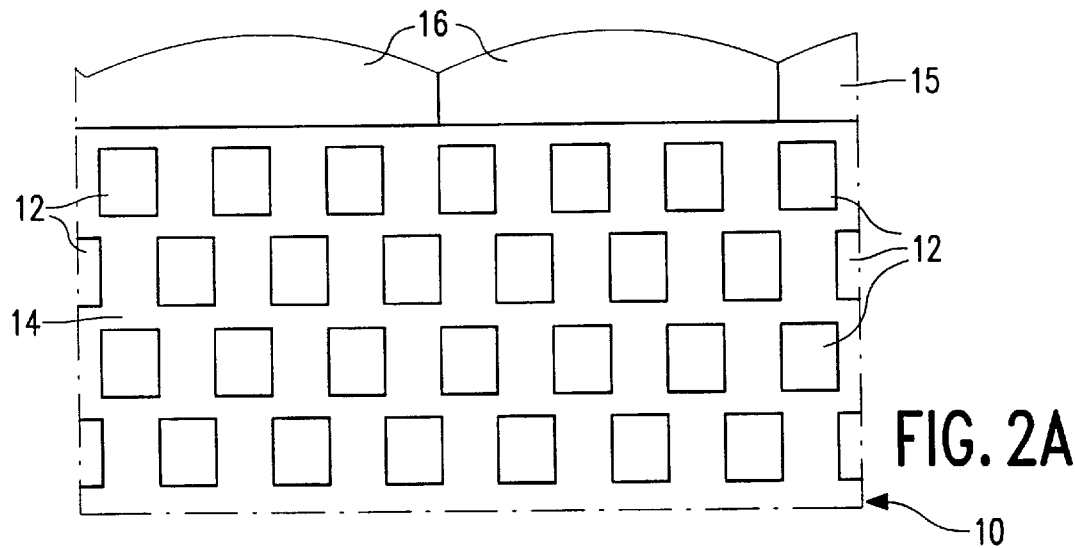
FIGS. 2A and 2B illustrate schematically two known display element arrangements for an LC display panel used as a spatial light modulator in autostereoscopic display apparatus.
Figure 2B:
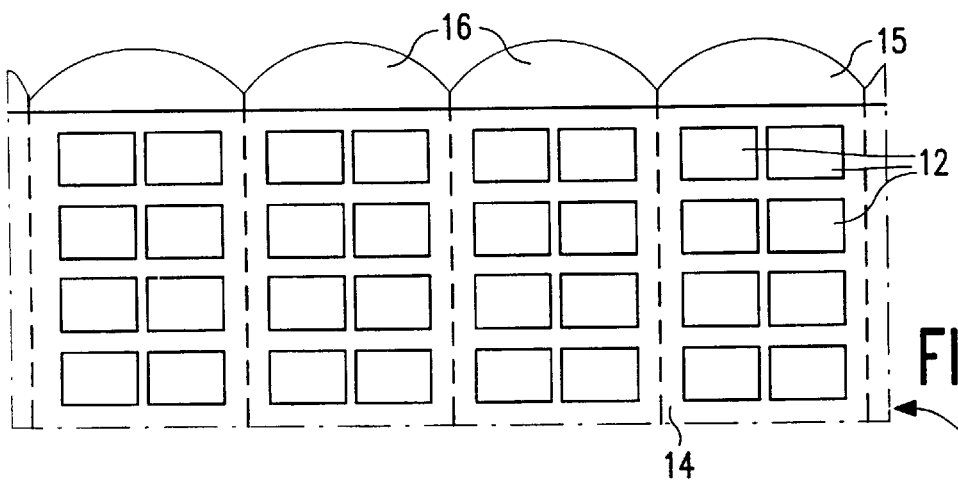

The presence of this black matrix, or more precisely the portions of the matrix extending continuously in the column direction between adjacent columns of display elements, causes a problem when using such a display panel for autostereoscopic display purposes. To provide an autostereoscopic 3D display, optical director means, in the form, for example, of a lenticular screen, is placed over the display panel as is described, for example, in EP-A-0625861 and the paper entitled "3D Displays for Videotelephone Applications" by D Sheat et al in the Proceedings of EuroDisplay 93 Conference at Strasbourg in August 1993, whose disclosures are incorporated herein by reference. Such a screen consists of an array of parallel, optically cylindrically converging lenticules, for example formed as plano-convex cylindrical lenses or graded refractive index cylindrical lenses, each of which overlies a respective group of columns of display elements. A lenticular screen is shown at 15 in FIG. 1, the screen having individual lenticules 16. With the display panel illuminated from the other side, each lenticule provides a spatially discrete output beam from each of the columns of display elements in its associated group. However, the lenticule also images the vertical portions of the black matrix between each display element column as a result of which dark regions are visible between the output beams from adjacent display element columns so that the display does not possess continuous parallax. This problem could be alleviated, as is described in EP-A-0 625,861, by arranging the display elements such that in each group they are substantially contiguous with one another in the row direction. In one example, as illustrated in FIG. 2A, adjacent display elements in a group (each group comprising six display elements in this example), are offset from one another in the column direction with their facing vertical edges aligned with one another vertically and with the bottom edge of one being closely aligned with the top edge of the other horizontally. In another example, as illustrated in FIG. 2B, just two display elements are provided in a group and are arranged close together and in line in the row direction such that the width of the gap between adjacent display elements in a group becomes very small. The arrangement of FIG. 2B can only provide two sub-images for one stereoscopic display picture. The lenticular screens and their lenticules are depicted schematically at 15 and 16. For a full color display each display element is in effect sub-divided into three sub-elements, displaying red, green and blue colors respectively, that are aligned with one another in the column direction. With these arrangements it is intended that the display elements of a group are substantially contiguous in the row direction so as to avoid or minimize the above described problem caused by vertical portions of the black mask. In the first example, FIG. 2A, there are no longer continuous portions of black mask extending vertically in the column direction. In the second example, FIG. 2B, then because the gap between the two adjacent display elements in a group is made deliberately very small the effects of any black mask between the columns of display elements become less perceptible.

Matrix display panels used in embodiments of autostereoscopic display apparatus in accordance with the invention are shown in FIGS. 3, 5, 7, 8 and 9. The matrix display panels comprise a spatial light modulator in the form of an LC matrix display panel. In these embodiments, the display elements in the planar array are arranged in groups of three or more elements to provide two or more stereoscopic images and such that, in a group, adjacent display elements partly overlap one another in the column direction. As such, an imaginary straight line extending in the column direction crosses through parts of an adjacent pair of display elements. The overlapping nature of adjacent display elements in a group can be achieved in various ways as will become apparent. Generally, the adjacent display elements in this respect will be adjacent both in the physical sense as well as in the viewing sense, that is, the order in which they are viewed as the viewer's head is moved in the row direction. However, it could be that an adjacent element in the viewing sense is not the physically nearest display element.

Figure 3:
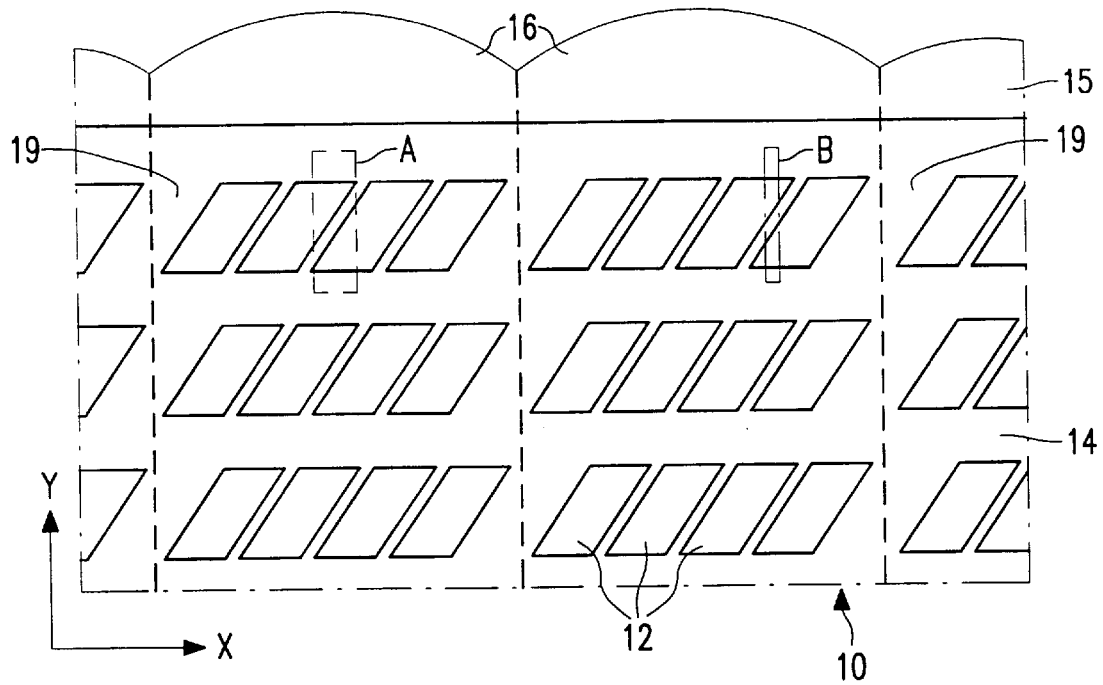
FIG. 3 shows schematically a typical part of the display element arrangement in an LC display panel used in a first embodiment of autostereoscopic display apparatus according to the invention.

Referring to FIG. 3, illustrating schematically a typical portion of an LC display panel 10 in a first embodiment, the display elements 12 in the planar array are non-rectangular parallelogram shaped, all orientated in the same manner and of substantially identical dimensions. The elements are arranged in rows and columns extending in a row direction X and column direction Y, respectively, and in groups, each group having in this particular example four adjacent (physically and in the viewing order sense) display elements 12, aligned in the row direction, giving three stereoscopic views. The facing edges of adjacent display elements 12 in a group are parallel and spaced apart by a small gap. As the facing sides of the display elements 12 are sloping, then there are no continuous bands of black mask material extending in the vertical, column, direction between the display elements in a column of groups. Adjacent groups in the row direction are separated by gaps 19.

Switching devices, TFTs or TFDs, associated with the display elements are disposed in the gaps between adjacent rows of display elements, together with address conductors extending in the row direction for driving the display elements. For simplicity, the switching devices and address conductors are not shown. In the case of a TFD type display panel, the display element electrodes defining the display elements, the set of row address conductors and the TFDs, each connected between a display element electrode and an associated row address conductor, are carried on one plate while a set of column address conductors, each overlying a respective column of display element electrodes, is carried on the other plate in conventional manner. In the case of a TFT type display panel, then the TFTs are similarly disposed in the gaps between adjacent rows with their gates connected to a respective one of a set of row address conductors extending along those gaps. The column address conductors could perhaps be routed through the gaps between the columns of display element electrodes on the one substrate but because it is desirable to keep these gaps narrow then conveniently the four column conductors for the four columns of display element electrodes of a column of groups can extend on the one substrate in the vertical gaps 19 between adjacent columns of groups with conductive extensions connecting a column conductor to the TFT of its associated display element extending in the gap between adjacent rows, alongside the row address conductors.

As can be seen from FIG. 3, each display element 12 in a group overlaps partly an adjacent display element 12 in the column direction. Thus, as shown at the box illustrated in broken outline at A in FIG. 3, a top right hand corner portion on one display element overlies in the column direction a bottom left hand corner portion of an adjacent display element. The extent of such overlap can be varied and is dependent on the angle and the dimensions of the parallelogram. In a particularly preferred layout, it is arranged that the upper left corner of one display element is substantially in alignment in the vertical, column, direction with the lower left corner of the adjacent display element.

Figure 4:
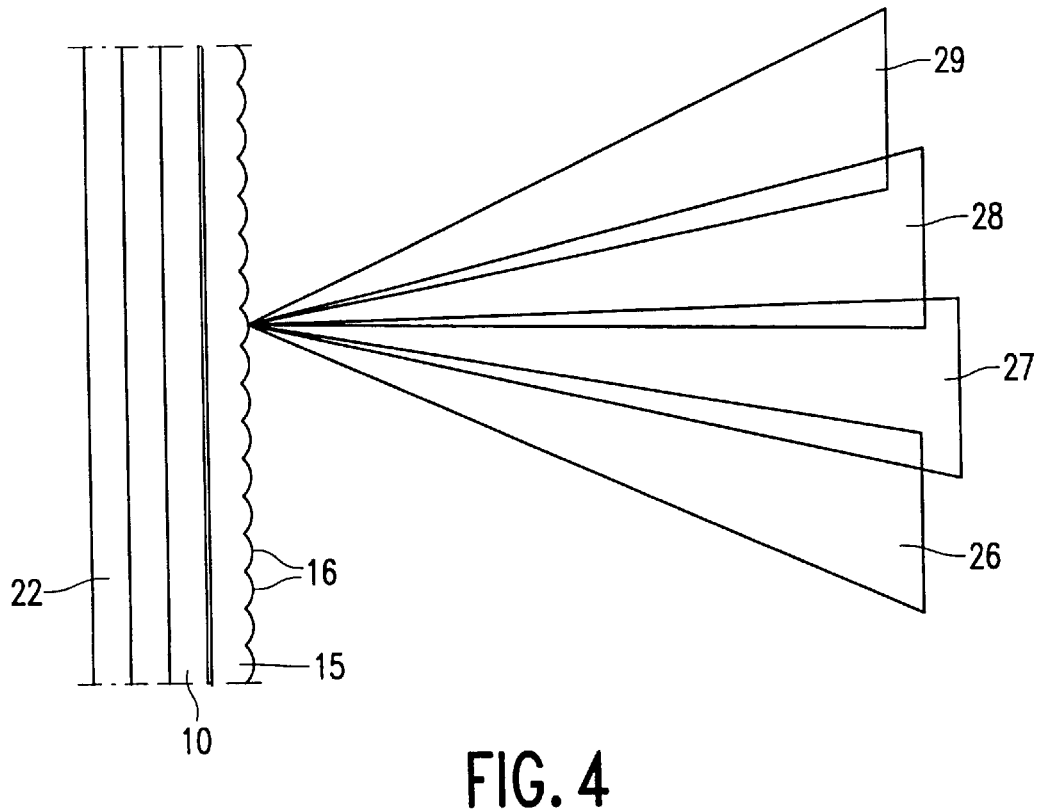
FIG. 4 is a plan schematic view of the first embodiment illustrating its operation.

The output of the display panel is viewed through optical director means disposed over one side of the panel which in this embodiment comprises a lenticular screen 15 having an array of parallel optically cylindrically converging lenticules indicated at 16 in FIG. 3, each of which extends in the column direction and overlies a respective column of display element groups, that is, four columns of display elements. FIG. 4 is a plan schematic view of the apparatus illustrating its operation. The display panel 10 is illuminated from behind by suitable illuminating means 22 and light from the illuminating means 22 is modulated by the display elements of the panel according to display information used to address the elements. The display elements are driven in this respect such that a narrow vertical slice of a 2D image is displayed by each column of display elements. The display produced comprises interleaved 2D sub-images which can be seen by the left and right eye of a viewer and constituted by the outputs from respective columns of display elements. Each lenticule 16 provides four output beams, one from each of the associated four columns of display elements, indicated at 26 to 29, whose optical axes are in mutually different directions and angularly spread around the longitudinal axis of the lenticule. With appropriate 2D image information applied to respective columns of display elements then to a viewer whose eyes receive different ones of the beams 26 to 29 a 3D image is perceived. As the viewer's head moves in the row, X, direction (FIG. 3) that is, up and down in FIG. 4, then three stereoscopic images can be viewed, as provided by the beams 26 and 27, 27 and 28, and 28 and 29 respectively. The display elements 12 in a group are in effect substantially contiguous with one another in row direction X. Dark regions separating the output beams are eliminated and continuous horizontal parallax is obtained. Unlike the output beams provided by a group in the known display element arrangement illustrated in FIG. 2A, which are angularly contiguous, adjacent ones of the output beams 26 to 29 overlap with one another to an extent, as depicted in FIG. 4, due to the overlap between adjacent display elements in the group. As a consequence, when a viewer's eye is moved, for example, between beams 26 and 27, the perceived view does not flip or jump abruptly to the next view but instead the views are merged to give a smooth transition.

The shape and arrangement of the display elements in a group gives to the viewer the impression of the display elements being substantially contiguous in the row direction. However, unlike the type of arrangement of FIG. 2B, the gap between adjacent display elements does not need to be very small but could, for example, be sufficiently large to accommodate column address conductors extending between columns of display elements in the case of a TFT display panel if required rather than in the gaps 19.

The shape and arrangement of the display elements also means that if the brightness of the output as a function of distance in the row, X direction is considered, then, assuming the display elements of a group are at the same transmission level, the brightness perceived by the eye as the four output beams 26 and 29 are traversed remains substantially constant even at those intermediate regions where adjacent output beams overlap and disturbance to a viewer caused by brightness variations is avoided. This can be appreciated by imagining that a slit, as indicated in a dashed outline at B in FIG. 3, whose width is significantly less than the width of a display element and which extends in the vertical, column direction, Y, is moved across the display elements of a group in the row, X, direction. The area of one or more of the display elements visible through the slit, and hence the brightness perceived, at any time remains substantially constant. This is in contrast to the arrangement of FIG. 2B in which, as the slit moves over the group between adjacent display elements, the extent of display element area visible through the slit, and hence the brightness, is reduced. Dark regions will be visible to a viewer as a result of the comparatively wide gaps 19 extending in the column direction between adjacent groups but these can actually assist the ease of viewing as they provide a clear separation between the outputs of adjacent groups and help prevent viewing of unrelated output beams. As mentioned, the gaps 19 could be used for the column address conductors in the case of a TFT type panel. For a TFD type panel, which does not require column address conductors to be provided in this manner but uses transparent column conductors carried on a separate plate and overlying respective columns of display element electrodes, greater freedom in the display element layout is possible. These gaps may, if desired, be reduced in width so that groups of display elements in the row direction are substantially contiguous with one another.

As an example of the dimensions involved, the side of the display elements may be around 300 μm in height and 100μ in width and the gap between adjacent display elements in a group around 20 μm in width.

Figure 5:
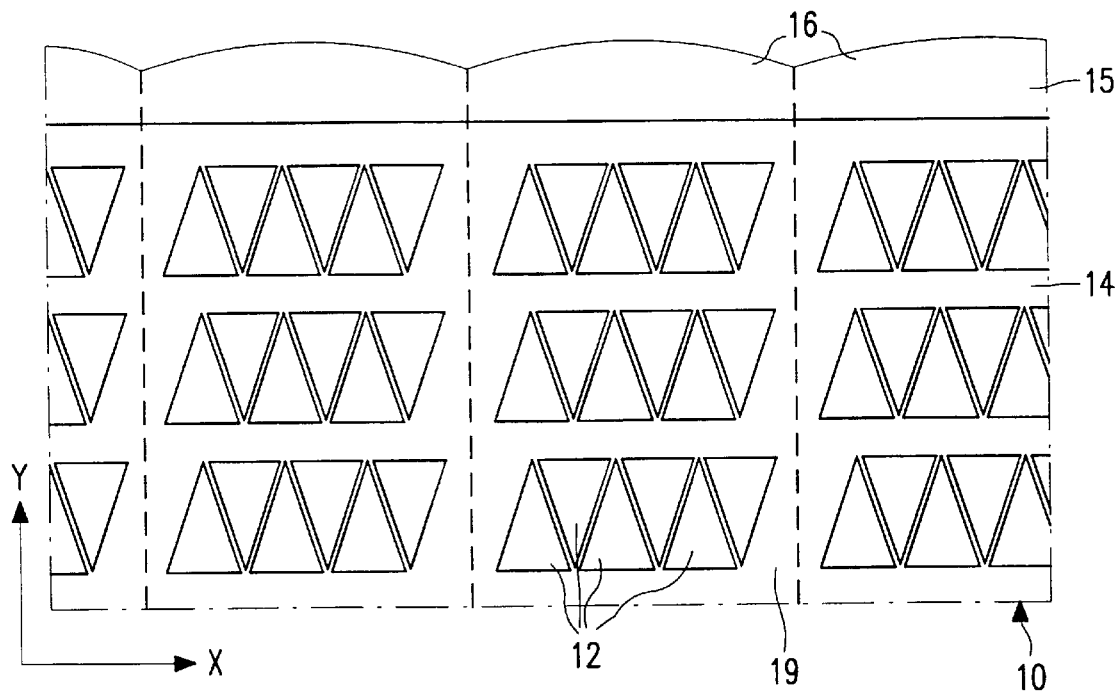
FIG. 5 shows schematically a typical part of the display element arrangement in an LC display panel used in a second embodiment of autostereoscopic display apparatus according to the invention.

FIG. 5 shows a typical portion of an LC display panel 10 used as a spatial light modulator in a second embodiment of apparatus. The display elements 12 in this embodiment are in the shape of isosceles triangles of identical dimensions. The display elements in each group, there being six in this example, giving five stereoscopic images, are arranged with adjacent display elements being inverted with respect to one another such that the apex of one element is adjacent the base of the next element. The axes of the triangles are parallel and extend in the column, Y, direction. The bases of alternate triangles extend in straight lines in the row direction. Thus, in each group, each display element overlaps in the column direction an adjacent display element. A base corner of one display element overlies, approximately, the center of the base of an adjacent element. Apart from the first and last elements, each display element overlies two adjacent elements in this manner, one on each side. Each column of display element groups underlies a respective lenticule 16 of the lenticular sheet 15 and adjacent groups of display elements in the row direction are separated by a gap 19. As an example of typical dimensions, the base of the display elements may be around 150 μm and their height around 300 μm. The gap between facing sides of adjacent elements may be around 20 μm.

Figure 6:
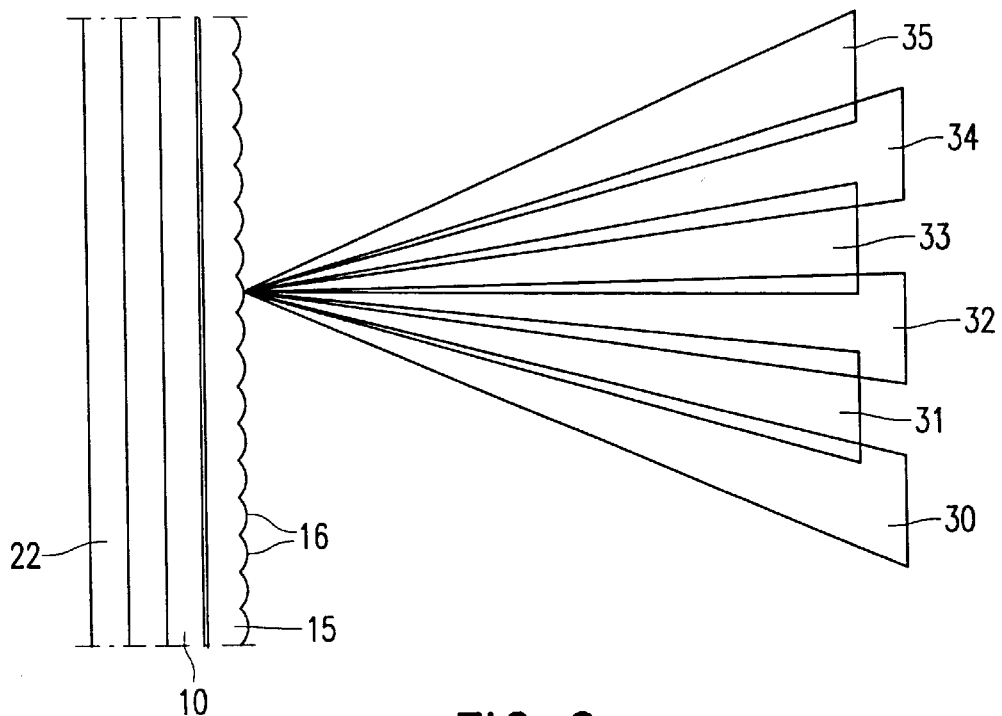
FIG. 6 is a plan schematic view of the second embodiment illustrating is operation.

FIG. 6, corresponding to FIG. 4, illustrates the operation of this embodiment. A plurality, six in this case, of output beams 30 to 35 are provided by each lenticule in mutually different angular directions around the longitudinal axis of the lenticule. The effects obtained are similar to those of the previous embodiment. As with the previous embodiment, the overlapping nature of adjacent display elements in a group results in an overlapping of the adjacent output beams such that the different views perceived by a viewer merge rather than flip. Again, an impression is given to the viewer of the display elements in a group being substantially contiguous in the row direction and the brightness of the views obtained from a group remains substantially constant, assuming the display elements are driven to the same transmissive level, even at the regions of overlap between adjacent ones of the output beams. Switch devices, again preferably TFDs, can be accommodated as described previously.

Figure 7A:
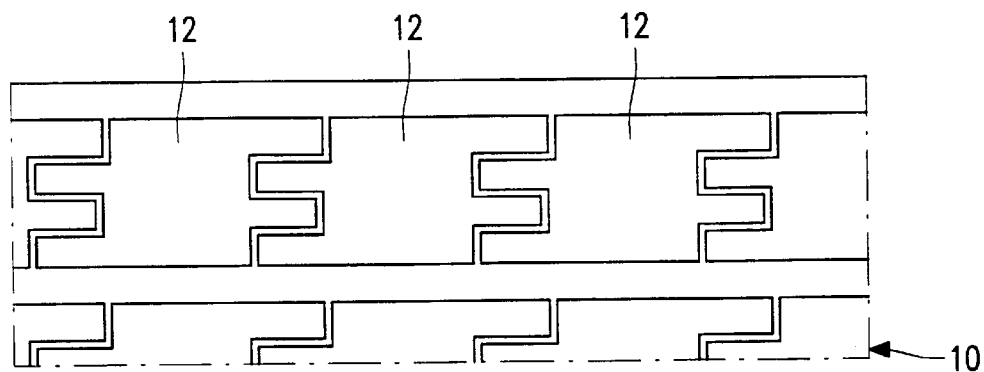
FIGS. 7(A)–7(B), 8 and 9 show schematically further examples of the display element arrangements in LC display panels used in third, fourth and fifth embodiments of autostereoscopic display apparatus respectively.
Figure 7B:
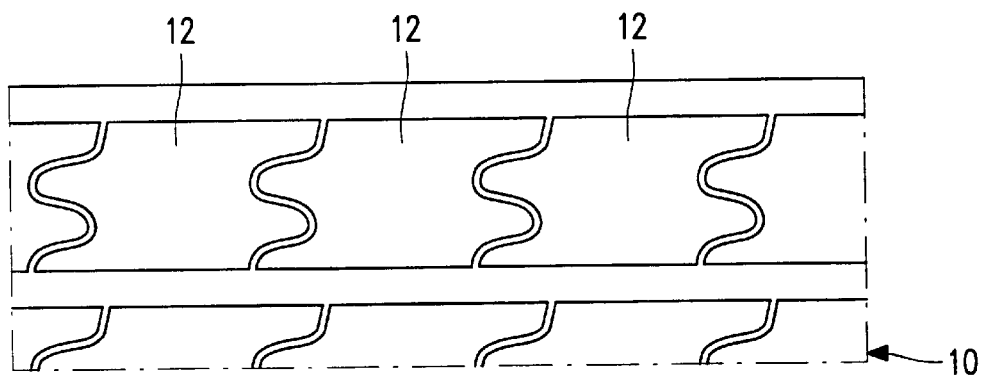

Another example of display panel in a third embodiment of apparatus which similarly results in the elimination of dark regions and merging between adjacent output beams from a lenticule is shown in FIG. 7. In this, the display elements 12 have an overall generally rectangular shape but with the facing sides of adjacent display elements in a group being interdigitated. The manner of interdigitation illustrated in FIG. 7A involves rectilinear fingers but the interdigitations could instead be curved, as shown, for example, in FIG. 7B. The display elements in a group are substantially contiguous in the row direction. Because the small gap separating the interdigitations occupies a greater proportion of the area of overlap between adjacent display elements, compared with the previous embodiments, there may be a slight fall off noticeable in the brightness at the overlap regions between adjacent output beams, as determined by the interdigitated area.

Figure 8:
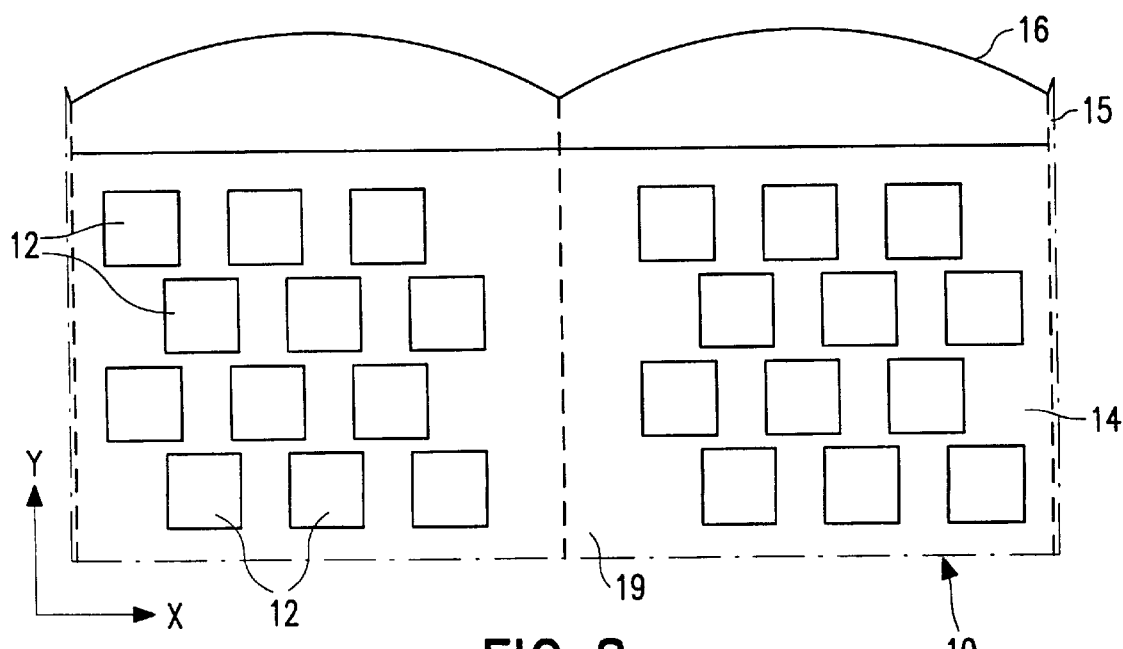

A further, fourth, embodiment will now be described with reference to FIG. 8 which uses a modified form of the display element arrangement illustrated in FIG. 2A. As in the case of FIG. 2A, the display elements 12 in a group in this arrangement are generally rectangular and are made contiguous will one another in the row direction by offsetting adjacent elements in the column direction such the display elements of a group, six in this example, lie in two rows, three in each. However, whereas the display elements in FIG. 2A are positioned such that the right hand edge of one element lies on the same vertical line as the left hand edge of its adjacent element, the display elements in this arrangement are positioned such that adjacent pairs of display elements partly overlap one another in the column direction. Thus, for example, the right hand edge of one display element lies on a vertical line which intersects an adjacent element and the left hand edge of that adjacent element lies on a vertical line which intersects the one display element. As a result, the output beams provided by a lenticule 16 overlying the six display elements will be such that each pair of adjacent beams partly overlap one another to provide a merging effect. Because larger spaces are present between the display elements in this arrangement, column address conductors, in the case of a TFT type panel, can be routed in zig-zag fashion between adjacent columns of display elements and it is not necessary to space adjacent groups apart to provide a space to accommodate these conductors. However, these larger spaces, in which black masking is present, will mean that light throughput is lowered, and consequently the overall brightness of the display produced is reduced compared with the previous embodiments.

Figure 9:
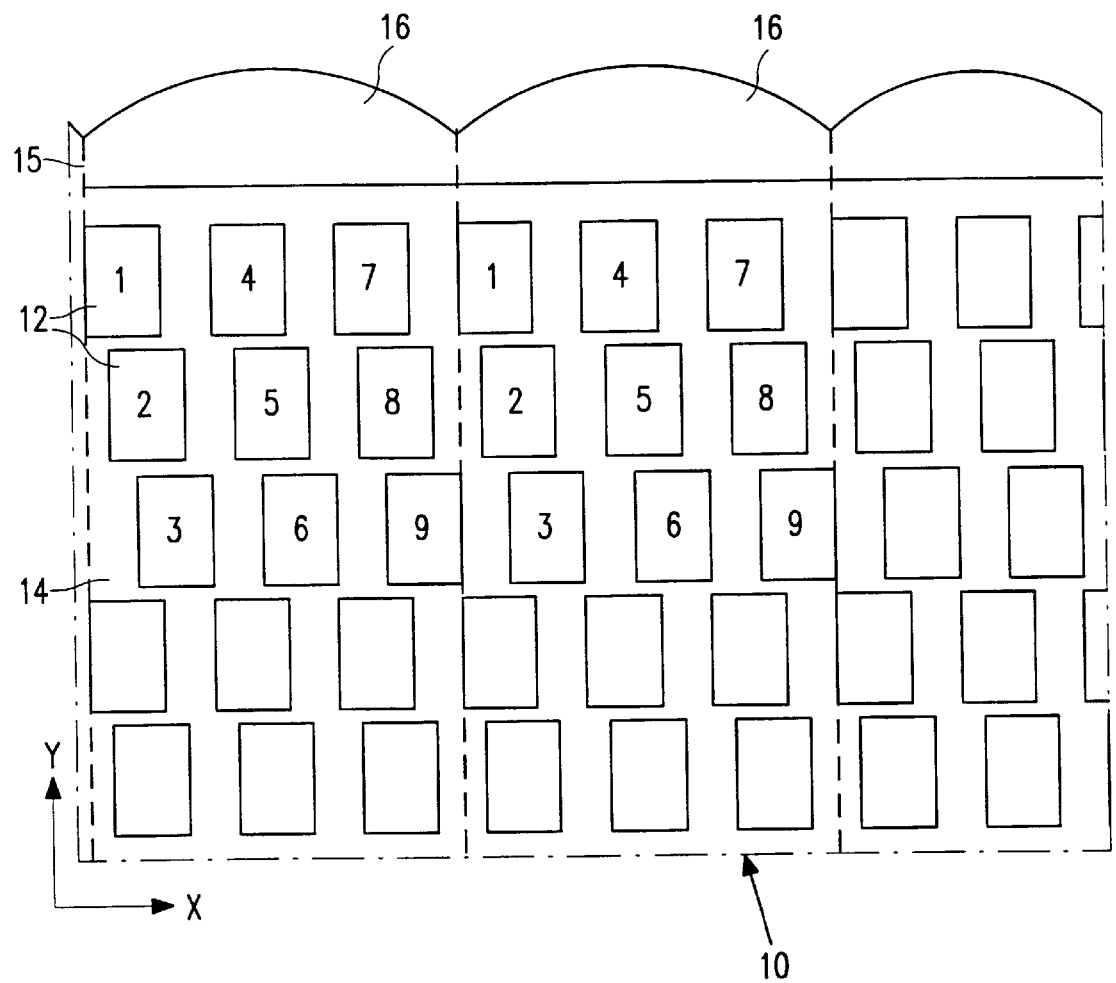

With this type of layout, the number of 2D views obtained can be increased compared with a conventional lay-out, but at the expense of vertical resolution. However, again compared with the previous embodiments, the brightness of the output will increase at the regions of overlap between adjacent output beams rather than remaining substantially constant. The reason for this will be understood if an imaginary slit of a length corresponding to the overall height of the group and of a width small compared with the width of an element is moved over the group in the row direction. When the slit reaches a region where one display element overlaps an adjacent element, the extent of the area of the display elements in the slit increases. The problem of such brightness variation can be overcome to an extent using a modified form of this kind of display element arrangement in a fifth embodiment, as shown in FIG. 9. In this arrangement, the display elements are in groups of nine with the elements of each group being contiguous in the row direction by positioning the elements in three rows, each with three elements, giving eight stereoscopic views. The order of the views, and the order of the output beams provided by the associated lenticule 16 is denoted by the numbers 1 to 9. Thus, for example, display element 3 is adjacent display element 2 and display element 4 is considered to be adjacent display element 3 even though display elements 5 and 6 are physically closer to display element 3 than display element 4. The display elements are arranged such that adjacent elements, in the viewing order sense, overlap one another in the column direction. Thus, display elements 1 and 2, 2 and 3, 3 and 4, 4 and 5 etc, partly overlap. It is to be noted that display element 1 and display element 3, display element 2 and display element 4, display element 3 and display element 5, display element 4 and display element 6 etc. do not overlap. Rather, their vertical edges are simply aligned.

While, with regard to the preceding description of known autostereoscopic display apparatus and embodiments of the present invention, the effect of black mask portions between the columns of display elements has been discussed particularly, it will be appreciated that similar problems with unwanted display artifacts would exist even if these black mask portions were to be omitted from the panel (while still retaining black mask portions in the row direction). Unmodulated regions of liquid crystal material would then be exposed which, depending on the nature of the LC panel, would appear as either dark regions or as light regions causing dark bands, as previously or bright bands to be imaged. The apparatus of the present invention would similarly overcome such a problem.

The autostereoscopic display apparatus which have been described above are of a simple and basic form. It will be appreciated, however, that the invention can be applied to other kinds of autostereoscopic display apparatus which employ a spatial light modulator, for example the kinds of apparatus as described in EP-A-0 625 861 which use an array of light sources that are sequentially illuminated in synchronization with display information by being applied to the LC display panel and in which an additional lenticular sheet or a parallax barrier is used adjacent the light input side of the spatial light modulator.

Moreover, the apparatus may be of the projection kind in which the output from the display panel is projected via a projection lens onto a lenticular screen backed by a diffuser as is also described in EP-A-0625 861, the screen and diffuser constituting the optical director means.

Forms of optical director means other than a lenticular screen can be used, such as a microlens screen, a parallax barrier having slits which extend in the column direction and which are aligned with respective columns of display element groups, as also described in EP-A-0 625 681, or a holographic element.

The number of display elements in a group can be varied, the numbers used in the above described embodiments being by way of illustration.

All the above-described embodiments can be utilized to provide a color display using colors filters in the panel so that each display element provides either a red, green or blue output. Various configurations of the different colors are possible as will be understood by persons skilled in the art. The different color filters would be arranged so as to achieve a color balance in each view constituting a stereoscopic image over a substantial area. For example, with regard to the embodiments of FIGS. 3, 5 and 7, the display elements in each row may be arranged to display a respective colour with three successive rows displaying respectively red, green and blue, the pattern of colors being repeated for other rows of the panel. Alternatively, with reference for example to FIG. 3, the display elements of three successive groups in the row direction may be arranged to display RGBRGBRGBRGB, and those in the other rows arranged in the same way.

It is envisaged that matrix display panels other than liquid crystal panels may be used, such as other forms of spatial light modulators or other types of display panels such as electroluminescent or plasma panels.

From reading the present disclosure, other modification will be apparent to persons skilled in the art. Such modifications may involve other features which are already known in the field of autostereoscopic displays and matrix display panels and which may be used instead of or in addition to features already described herein.

What is claimed is:

1. An autostereoscopic display apparatus comprising:
   a matrix display panel having an array of display elements which are arranged so as to extend in rows and columns in row and column directions, respectively,
   said display elements arranged in groups with each group comprising N adjacent display elements in the row direction where N is a number greater than two, and
   optical director means comprising a plurality of optical director elements each of which is associated with a respective group of display elements for directing the outputs of the display elements in the group in mutually different angular directions,
   characterized in that the display elements in each group are arranged such that in the column direction adjacent display elements partly overlap one another.

2. An autostereoscopic display apparatus according to claim 1, characterized in that the display elements are non-rectangular parallelogram shaped and, in a group, are arranged in a line with the facing edges of adjacent display elements being substantially contiguous and extending at an angle to the column direction.

3. An autostereoscopic display apparatus according to claim 2, characterized in that a corner at one side of a display element is substantially aligned in the column direction with a corner at the same side of an adjacent display element.

4. An autostereoscopic display apparatus according claim 3, characterized in that the optical director means comprises a lenticular screen having a plurality of elongate lenticules extending in the column direction.

5. An autostereoscopic display apparatus according claim 3, characterized in that the optical director means comprises a parallax barrier having a plurality of elongate slits extending in the column direction.

6. An autostereoscopic display apparatus according claim 3, characterized in that the matrix display panel comprises a liquid crystal panel.

7. An autostereoscopic display apparatus according claim 2, characterized in that the optical director means comprises a lenticular screen having a plurality of elongate lenticules extending in the column direction.

8. An autostereoscopic display apparatus according claim 2, characterized in that the optical director means comprises a parallax barrier having a plurality of elongate slits extending in the column direction.

9. An autostereoscopic display apparatus according claim 2, characterized in that the matrix display panel comprises a liquid crystal panel.

10. An autostereoscopic display apparatus according to claim 1, characterized in that the display elements are of triangular shape and, in a group, are arranged in line extending in the row direction with the orientation of one display element being inverted with respect to an adjacent display element such that facing edges of adjacent display elements are substantially contiguous and extend at an angle to the column direction.

11. An autostereoscopic display apparatus according to claim 10, characterized in that a base corner of one display element is substantially aligned in the column direction with the center of the base of an adjacent display element.

12. An autostereoscopic display apparatus according claim 10, characterized in that the optical director means comprises a lenticular screen having a plurality of elongate lenticules extending in the column direction.

13. An autostereoscopic display apparatus according claim 10, characterized in that the optical director means comprises a parallax barrier having a plurality of elongate slits extending in the column direction.

14. An autostereoscopic display apparatus according to claim 1, characterized in that the display elements are arranged in a line and shaped such that the facing edges of adjacent display elements are interdigitated with one another in the row direction.

15. An autostereoscopic display apparatus according to claim 1, characterized in that the display elements in a group are substantially rectangular in shape and arranged such that one display element is offset in the column direction with respect to an adjacent display element with an edge of the one display element overlying in the column direction the adjacent display element.

16. An autostereoscopic display apparatus according to claim 15, characterized in that the number N of elements in each group is at least six, and wherein successive adjacent display elements in a group are arranged in at least three rows.

17. An autostereoscopic display apparatus according to claim 1, characterized in that the optical director means comprises a lenticular screen having a plurality of elongate lenticules extending in the column direction.

18. An autostereoscopic display apparatus according to claim 1, characterized in that the optical director means comprises a parallax barrier having a plurality of elongate slits extending in the column direction.

19. An autostereoscopic display apparatus according to claim 1, characterized in that the matrix display panel comprises a liquid crystal panel.

20. An autostereoscopic display apparatus according to claim 19, characterized in that the matrix display panel comprises an active matrix liquid crystal panel in which each display element is associated with a two-terminal non-linear switch device.

21. An autostereoscopic display apparatus comprising:

a matrix display panel having an array of display elements which are arranged so as to extend in rows and columns in row and column directions, respectively, and a black matrix surrounding said display elements, said display elements arranged in groups with each group comprising N adjacent display elements in the row direction where N is a number greater than two, and optical director means comprising a plurality of optical director elements each of which is associated with a respective group of display elements for providing a plurality of successive two dimensional views in different angular directions by directing the outputs of the display elements in the group in mutually different angular directions, wherein the display elements in each group are arranged for reducing display artifacts resulting from the black matrix surrounding said display elements such that in the column direction adjacent display elements partly overlap one another.

22. An autostereoscopic display apparatus according to claim 21, wherein said optical director elements comprise lenticular elements.

* * * * *